United States Patent [19]

Asztalos

[11] Patent Number: 4,475,930
[45] Date of Patent: Oct. 9, 1984

[54] PRESSURE SWING ADSORPTION SYSTEM USING PRODUCT GAS AS REPLACEMENT FOR PURGE GAS

[75] Inventor: Stefan Asztalos, Munich, Fed. Rep. of Germany

[73] Assignee: Linde Aktiengesellschaft, Wiesbaden, Fed. Rep. of Germany

[21] Appl. No.: 467,060

[22] Filed: Feb. 16, 1983

[30] Foreign Application Priority Data

Feb. 16, 1982 [DE] Fed. Rep. of Germany ....... 3205451

[51] Int. Cl.³ .............................................. B01D 53/04
[52] U.S. Cl. .......................................... 55/26; 55/58; 55/62; 55/68; 55/75
[58] Field of Search .................... 55/18, 20, 21, 25, 26, 55/58, 62, 74, 75, 161–163, 179, 387, 389, 68

[56] References Cited

U.S. PATENT DOCUMENTS

| 3,564,816 | 2/1971 | Batta | 55/26 |
| 3,636,679 | 1/1972 | Batta | 55/26 |
| 3,986,849 | 10/1976 | Fuderer et al. | 55/68 X |
| 4,070,164 | 1/1978 | Miwa et al. | 55/26 |
| 4,077,780 | 3/1978 | Doshi | 55/26 |
| 4,140,495 | 2/1979 | Pietruszewski | 55/21 |
| 4,234,322 | 11/1980 | DeMeyer et al. | 55/21 X |
| 4,299,595 | 11/1981 | Benkmann et al. | 55/25 X |

FOREIGN PATENT DOCUMENTS 2624346 12/1977 Fed. Rep. of Germany .

Primary Examiner—Robert Spitzer
Attorney, Agent, or Firm—Millen & White

[57] ABSTRACT

In a pressure swing adsorption plant for the purification and separation of gases, with several adsorbers, conducting respectively within one cycle the steps of adsorption, expansion or pressure equalization, purging, and pressure buildup, using as the purge gas residual gas released during the expansion of adsorbers, wherein pressure buildup is conducted at least in part with product gas, and when there is a malfunction in an adsorber yielding purge gas, the product gas is employed not only for the pressure buildup but also for purging one or more adsorbers. The amount of purge gas is controlled so that the adsorber or adsorbers, which are in the pressure buildup phase reach the desired adsorption pressure within a previously determined period of time.

6 Claims, 2 Drawing Figures

PRESSURE SWING ADSORPTION SYSTEM USING PRODUCT GAS AS REPLACEMENT FOR PURGE GAS

CROSS-REFERENCE TO RELATED APPLICATION

This invention is related to applicant's concurrently filed application entitled "Pressure Swing Adsorption Malfunction Control", the contents thereof being incorporated by reference herein.

BACKGROUND OF THE INVENTION

This invention relates to a process for operating a pressure swing adsorption (PSA) system for the purification and separation of gases. PSA requires several adsorbers wherein, in one cycle, there are the steps of adsorption, expansion or pressure equalization, purging, and pressure buildup, with the purge gas commonly being the residual gas released during the expansion of adsorbers, and the pressure buildup gas commonly being at least the product gas.

Adsorption processes are frequently utilized because of their economy and efficacy for the purification and separation of gases, for example for the purification of natural gas or for the fractionation of noble gases, air, town gases, cracked gases, hydrogen-rich gaseous mixtures, or gaseous hydrocarbons. In this connection, the PSA methods have proven themselves to be particularly cost effective. In these processes, the desorption and/or regeneration is accomplished by lowering the pressure above the loaded adsorbent. The desorption is completed in the final stages frequently by the use of a purge gas. The gases liberated during the depressurization (expansion) of a loaded adsorber are also utilized more or less completely for raising the pressure in other adsorbers which are at a lower pressure level.

Thus, it has been known, for example, from DOS No. 2,624,346 to use, for the purification or fractionation of several of the aforementioned gaseous mixtures, PSA systems equipped with up to nine adsorbers. The adsorption, effected at a relatively high pressure, is followed, in the known process, by several expansion steps, releasing initially the gas present in the voids between adsorbent particles, and subsequently adsorbed components as well. The first expansion steps are effected by pressure equalization with other adsorbers under lower pressures. Only the gas obtained in the final expansion stage is withdrawn as residual gas, followed by a countercurrent purging or regeneration step to remove, if at all possible, all adsorbed components from the adsorber. Gases obtained during the pressure lowering of adsorbers are used herein as the purge gases. In a number of pressure buildup steps, to a large part by pressure equalization with other adsorbers under higher pressures, the pressure in the desorbed adsorber is then raised again, the last pressure increase to adsorption pressure being conducted with product gas, i.e. the gas withdrawn from the adsorber during the adsorption step.

The adsorbers, conduits, and valves in such plants must be built to withstand severe conditions inasmuch as they are subjected to rapid pressure fluctuations and gas flows. Although this is taken into account in the designing of such plants, damage to and failure of adsorbers are nevertheless sometimes encountered. For example, regarding the adsorber or adsorbers yielding the purge gas, a malfunction results in pressure losses in the adsorbers and in the conduit system, thereby necessitating plant shutdown. Such a shutdown is not only economically disadvantageous per se, but it is also highly disruptive to downstream operations requiring a continuous flow of product or residual gas.

SUMMARY

It is, therefore, an object of one aspect of the present invention to provide a system permitting the continuous operation of a PSA plant even in the case of a failure of the adsorber or adsorbers discharging the purge gas, thereby ensuring a continuous delivery of product and/or residual gas.

Upon further study of the specification and appended claims, further objects and advantages of this invention will become apparent to those skilled in the art.

To attain these objects, according to one aspect of this invention, in case of failure of the adsorber or adsorbers yielding the purge gas, the product gas is used not only for pressure buildup, but also for purging one or several other adsorbers, and by regulating the amount of purge gas in such a way that the adsorber or adsorbers in the pressure buildup phase reach the desired adsorption pressure within a previously determined period of time.

Accordingly, the adsorber or adsorbers delivering the purge gas are thus replaced by a switchover so that purging is continued with product gas, and simultaneously the adsorption pressure is built up in one or more other adsorbers with product gas. The pressure buildup in this process must take place within a specific, predetermined time period, in order to ensure the continuity of the cycle sequence of the adsorption process. Accordingly, a preferred embodiment of an aspect of this invention provides that the purge gas quantity for the adsorber or adsorbers to be purged is throttled if the desired adsorption pressure has not been reached, or, upon reaching the desired adsorption pressure, the amount of purge gas is increased. This means that in case the desired adsorption pressure has not been reached, a greater amount of product gas is utilized for pressure buildup and a smaller amount of product gas is utilized for the purging step; and, when the desired adsorption pressure has been reached, less product gas is used for pressure buildup and more for the purge gas. This purification process is particularly amenable to operation with a computer, since the desired value for the pressure is a function dependent on time. Moreover, for measuring the instantaneous pressure (actual value measurement), a different adsorber is employed depending upon the cycle.

According to an apparatus aspect of this invention for conducting the process with several adsorbers, each adsorber is equipped with one pressure sensor, and each pressure sensor is connected to respectively one control valve associated with another adsorber in such a way that the control valve regulates the amount of purge gas in dependence on the instantaneous pressure measured by the pressure sensor.

The process and apparatus of this invention can be utilized in all PSA installations if the adsorber or adsorbers in the expansion phase used for providing the purge gas have failed to operate. This affords the possibility of switching over, in a PSA installation with four adsorbers, wherein one adsorber is in the adsorption phase, to a cycle scheme with only three adsorbers (likewise with one adsorber in adsorption phase) after the adsorber delivering the purge gas has become inoperative. Thereby, this invention significantly contributes to the maintained operating capability of PSA plants.

DETAILED DESCRIPTION

Figure 1:
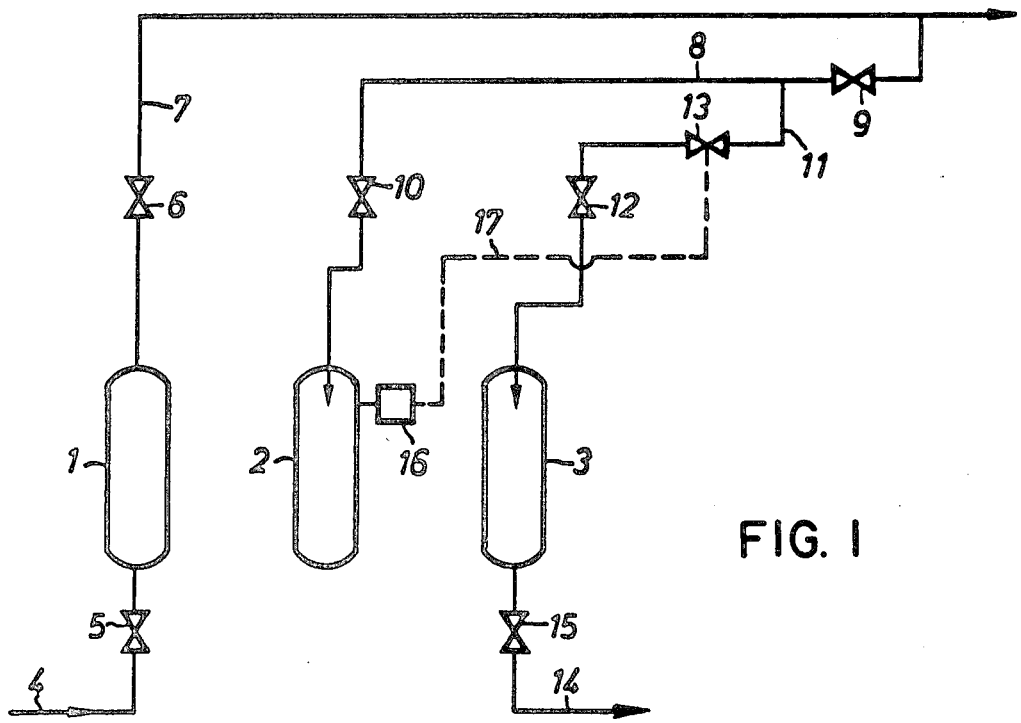
FIG. 1 is a schematic illustration of the invention utilizing three adsorbers in a specific cycle.

FIG. 1 illustrates a PSA system having three adsorbers 1, 2, 3 on an instantaneous basis in an arbitrary cycle, so that all conduits and valves unimportant for this cycle have been omitted for the sake of clarity. In the illustrated cycle, the adsorber 1 is in the adsorption phase and the adsorber 2 is in the pressure buildup phase and the adsorber 3 is being purged.

Raw gas enters the adsorber 1 via conduit 4 through valve 5. The readily adsorbable components are retained in this adsorber while the components having a lower degree of adsorbability leave the installation via valve 6 and conduit 7.

At the same time, in adsorber 2 (which, after the adsorption of readily adsorbable components, was subjected to regeneration, i.e. lowering of the pressure and subsequent purging) the pressure is being built up by introducing product gas into this adsorber via conduit 8 and open valves 9 and 10.

Adsorber 3 is being purged. (It has already completed adsorption of the readily adsorbable components and has been depressurized). In this connection, it is assumed that the adsorber or adsorbers yielding the purge gas have become inoperative. For this reason, product gas is utilized according to this invention, withdrawn from product in conduit 8 via tap line 11, control valve 13 and valve 12 for the purging of adsorber 3. The thus-formed gaseous mixture is exhausted via conduit 14 and open valve 15, and introduced, for example, into a compensating tank, not shown.

In the illustrated instantaneous view, the adsorber 2 is equipped with a pressure sensor 16, connected via an electric line 17 to the control valve 13 for adsorber 3.

Figure 2:
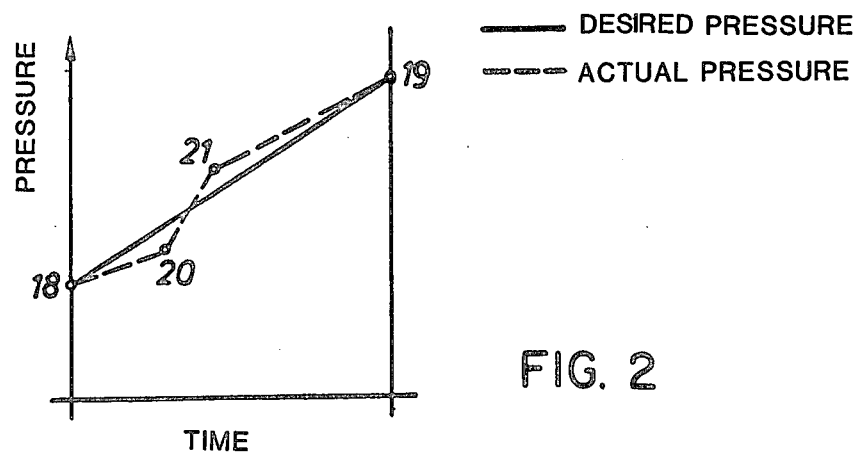
FIG. 2 is a graph of pressure as a function of time as it relates to a control valve diverting product gas to the purge phase.

The operation of control valve 13 as a function of the pressure measured in adsorber 2 is explained in FIG. 2 wherein the ordinate is pressure, plotted against time as the abscissa. Numeral 18 denotes the initial pressure and 19 denotes the final pressure during the pressure buildup in adsorber 2. The solid line relates to the required, desired pressure and the dashed line relates to the prevailing, actual pressure.

If the pressure sensor 16 in adsorber 2 measures a pressure below the necessary desired pressure, 20 (actual pressure is less than desired pressure), a corresponding electric signal is transmitted via a computer for example, not shown, and via line 17, to the control valve 13 so that the latter is partially throttled. Thereby more product gas passes into adsorber 2, and the adsorber pressure rises while simultaneously the amount of purge gas in adsorber 3 is reduced. In contrast, if the actual value recorded by the pressure sensor 16 lies above the necessary desired pressure value, 21 (actual pressure is greater than desired pressure), then control valve 13 is opened and thereby more product gas is conducted for purging purposes into adsorber 3 and less product gas for pressure buildup into adsorber 2. In this way, it is possible, for example, when switching over a PSA system having four adsorbers to three adsorbers (one adsorber in the adsorption phase), to replace the adsorber yielding the purge gas by purging with product gas and furthermore to ensure a continuous mode of operation.

It is self-evident to those skilled in the art that, in a complete adsorption installation, each adsorber is connected with three conduits corresponding to conduits 7, 8, and 11 with valves 6, 10, 12 and 13, as well as with measuring sensors and electrical lines to the respective control valves, so that each adsorber, although chronologically spaced vis-a-vis the other adsorber, repeatedly and sequentially follows the steps of adsorption, pressure equalization, purging, and pressure buildup, and the system provides, overall, a continuous product gas stream.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a pressure swing adsorption process utilizing a plurality of interconnected adsorbers, comprising the steps within one cycle of adsorption, expansion or pressure equalization, purging, and pressure buildup, wherein purified product gas is withdrawn during the adsorption step; purge gas for the purging step comprises residual gas released during the expansion of at least one adsorber; the pressure buildup step is conducted at least in part by blowing in product gas, and wherein there is a malfunction in the at least one adsorber yielding the purge gas so that insufficient purge gas is available, the improvement comprising employing the product gas for the pressure buildup and for purging one or several other adsorbers; and adjusting the amount of product gas used as purge gas so that the adsorbers, which are in the pressure buildup step, reach the desired adsorption pressure within a previously determined period of time.

2. A process according to claim 1, wherein the amount of purge gas is throttled if the desired adsorption pressure has not been reached.

3. A process according to claim 1, wherein the amount of purge gas is increased if the desired adsorption pressure has been reached.

4. A process according to claim 1, wherein the malfunctioning adsorber is replaced by switching the process over to a process using one less adsorber while providing a continuous mode of operation.

5. A process according to claim 1, wherein the product gas used for both pressure buildup and purging is from the same adsorber.

6. A process according to claim 1, wherein the product gas used for both pressure buildup and purging is the highest pressure gas withdrawn from an adsorber.

* * * * *